United States Patent
Bach et al.

(10) Patent No.: US 7,318,863 B2
(45) Date of Patent: Jan. 15, 2008

(54) AZO PIGMENT PREPARATIONS FOR PACKAGING GRAVURE AND FLEXOGRAPHIC PRINTING

(75) Inventors: Heinz Bach, Frankfurt am Main (DE); Ulrich Ott, Hofheim (DE); Rainer Winter, Oberursel (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/576,222

(22) PCT Filed: Oct. 5, 2004

(86) PCT No.: PCT/EP2004/011102

§ 371 (c)(1),
(2), (4) Date: Dec. 19, 2006

(87) PCT Pub. No.: WO2005/037929

PCT Pub. Date: Apr. 28, 2005

(65) Prior Publication Data

US 2007/0204762 A1    Sep. 6, 2007

(30) Foreign Application Priority Data

Oct. 16, 2003   (DE) .................. 103 48 106

(51) Int. Cl.
C09B 67/20    (2006.01)
C09B 67/08    (2006.01)
C09D 11/00    (2006.01)
C09D 11/08    (2006.01)

(52) U.S. Cl. ............... 106/494; 47/57.6; 106/31.73; 106/31.8; 106/31.81; 106/496; 106/500; 430/7; 430/108.23; 524/187

(58) Field of Classification Search ............ 106/31.73, 106/31.8, 31.81, 494, 496, 500; 47/57.6; 430/7, 108.23; 524/187
See application file for complete search history.

(56) References Cited

U.S. PATENT DOCUMENTS

| 3,759,733 | A | | 9/1973 | Bradley et al. | |
| 4,461,647 | A | * | 7/1984 | Schofield et al. | ........... 106/494 |
| 4,885,033 | A | | 12/1989 | Blackburn et al. | |
| 5,352,281 | A | | 10/1994 | Weide et al. | |
| 5,594,099 | A | * | 1/1997 | Bender | ........... 530/218 |
| 5,814,140 | A | | 9/1998 | Reisacher et al. | |
| 6,110,267 | A | | 8/2000 | Winter et al. | |
| 6,143,402 | A | * | 11/2000 | Reisacher | ........... 428/323 |
| 6,290,768 | B1 | | 8/2001 | McDevitt | |
| 6,432,195 | B1 | * | 8/2002 | Rathschlag et al. | ........... 106/500 |
| 6,641,655 | B1 | * | 11/2003 | McElhinney et al. | ........... 106/413 |
| 6,872,245 | B2 | | 3/2005 | Grimm et al. | |

FOREIGN PATENT DOCUMENTS

| DE | 2757815 | 6/1979 |
| DE | 19806397 | 10/1998 |
| EP | 0076024 | 4/1983 |
| EP | 0587021 | 3/1984 |
| EP | 0796900 | 9/1997 |
| GB | 2324097 | 10/1998 |
| WO | WO 01/14479 | 3/2001 |

OTHER PUBLICATIONS

PCT International Search Report for PCT/EP 2004/011102 mailed Mar. 31, 20005.
B.G. Hayes, Surface Treatment of Organic Pigments for Printing Ink Applications American Ink Maker vol. 62, No. 6, pp. 28-50, XP009045503, Jun. 1984.
Enos, et al., "Rosin & Rosin Derivatives" Encyclopedia of Chemical Technology, vol. 17, $2^{nd}$ ed. pp. 475, 488-491, 1968, no month.
English Translation of PCT IPER for PCT/EP2004/011102, mailed Sep. 21, 2006.

* cited by examiner

Primary Examiner—Anthony J. Green
(74) Attorney, Agent, or Firm—Anthony A. Bisulca

(57) ABSTRACT

The invention relates to an azo pigment preparation containing a) at least one azo pigment, b) a resin based on colophonium or modified colophonium with an acid value equal to or higher than 320 mg KOH/g, and c) an ammonium salt of a sulfonated diaryl yellow pigment.

10 Claims, No Drawings

AZO PIGMENT PREPARATIONS FOR PACKAGING GRAVURE AND FLEXOGRAPHIC PRINTING

This invention relates to azo pigments formulated with a specific natural resin derivative of high acid number and having improved performance characteristics, specifically improved rheology, when used in concentrates, for example for packaging gravure print and flexographic printing inks.

Printing inks, particularly packaging gravure and flexographic printing inks, are dispersed in the varnish and solvent with a high pigment concentration. The resulting concentrate for printing inks can be further processed to give the ready-produced printing ink. Concentrates for printing inks generally have a pigment content of up to 35%. After dispersion, concentrates are usually interveningly stored in specific containers before being further processed later.

The time delay due to storage before conversion into printing ink will in most cases result in the concentrate of the printing ink rebuilding its gel structure. This gel structure rebuild is due to the high concentrations and the associated interaction of the pigment particles with one another. In the extreme case, the gel structure rebuild causes the ink concentrate to thicken, which necessitates thinning of the thickened concentrate with solvent.

Since the changes in structure are time dependent, this rheological effect is referred to as thixotropy.

EP-A-0 796 900 discloses pigment formulations for water-thinnable printing inks that contain a resin having an acid number of up to 300 mg KOH/g. In the case of azo pigments, however, these formulations still exhibit distinct thixotropic behavior.

It is an object of the present invention to formulate azo pigments such that they not only have good coloristic properties, gloss for example, but also are flowable, especially in the course of printing ink concentrate production, in the course of further processing and in the course of storage.

We have found that this object is achieved, surprisingly, by the azo pigment formulation hereinbelow.

The present invention accordingly provides an azo pigment formulation comprising
a) at least one azo pigment, preferably a diaryl yellow pigment,
b) a resin based on rosin or modified rosin and having an acid number of not less than 320 mgKOH/g and preferably not less than 330 mg KOH/g, and
c) an ammonium salt of a sulfonated diaryl yellow pigment.

Preferred azo pigment formulations consist essentially of 50% to 90% by weight and especially 60% to 80% by weight of component a), 5% to 45% by weight and especially 10% to 38% by weight of component b) and 0.1% to 20% by weight and especially 2% to 10% by weight of component c), all based on the total weight of the azo pigment formulation.

Useful azo pigments a) include monoazo, disazo, β-naphthol, Naphtol AS, acetoacetylamino-benzimidazolone, acetoacetylamino-quinazolinedione and also acetoacetylamino-quinoxalinedione pigments.

Useful azo pigments include for example those having an amine component from the group consisting of aniline, 2-nitroaniline, methyl anthranilate, 2,5-dichloro-aniline, 2-methyl4-chloroaniline, 2-trifluoromethyl-4-chloroaniline, 2,4,5-trichloro-aniline; 3-amino4-methylbenzamide, 4-amino-3-chloro-N'-methylbenzamide, o-toluidine, o-dianisidine, 2,2',5,5'-tetrachlorobenzidine, 2-amino-5-methylbenzenesulfonic acid and 2-amino4-chloro-5-methylbenzenesulfonic acid. The following amine components are of particular interest for azo pigments: 4-methyl-2-nitrophenylamine, 4-chloro-2-nitrophenylamine, 3,3'-dichlorobiphenyl-4,4'-diamine, 3,3-dimethylbiphenyl-4,4'-diamine, 4-methoxy-2-nitrophenylamine, 2-methoxy-4-nitrophenylamine, 4-amino-2,5-dimethoxy-N-phenylbenzene-sulfonamide, dimethyl 5-aminoisophthalate, anthranilic acid, 2-trifluoromethyl-phenylamine, dimethyl 2-aminoterephthalate, 1,2-bis(2-aminophenoxy)ethane, 2-amino-4-chloro-5-methylbenzenesulfonic acid, 2-methoxyphenylamine, 4-(4-aminobenzoylamino)benzamide, 2,4-dinitrophenylamine, 3-amino-4-chloro-benzamide, 4-nitrophenylamine, 2,5-dichlorophenylamine, 4-methyl-2-nitro-phenylamine, 2-chloro-4-nitrophenylamine, 2-methyl-5-nitrophenylamine, 2-methyl4-nitrbphenylamine, 2-methyl-5-nitrophenylamine, 2-amino4-chloro-5-methylbenzenesulfonic acid, 2-aminonaphthalene-1-sulfonic acid, 2-amino-5-chloro-4-methylbenzenesulfonic acid, 2-amino-5-chloro4-methyl-benzenesulfonic acid, 2-amino-5-methylbenzenesulfonic acid, 2,4,5-trichlorophenylamine, 3-amino-4-methoxy-N-phenylbenzamide, 4-aminobenzamide, methyl 2-aminobenzoate, 4-amino-5-methoxy-2,N-dimethylbenzenesulfonamide, monomethyl 2-amino-N-(2,5-dichlorophenyl)terephthalate, butyl 2-aminobenzoate, 2-chloro-5-trifluoromethylphenylamine, 4-(3-amino4-methylbenzoylamino)benzenesulfonic acid, 4-amino-2,5-dichloro-N-methylbenzenesulfonamide, 4-amino-2,5-dichloro-N,N-dimethylbenzenesulfonamide, 6-amino-1 H-quinazoline-2,4-dione, 4-(3-amino-4-methoxybenzoylamino)benzamide and 4-amino-2,5-dimethoxy-N-methylbenzene-sulfonamide.

Useful azo pigments include for example those having a coupling component from the group of the acetoacetarylides of the general formula (I),

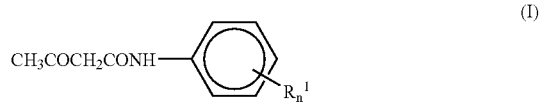

where
n is a number from 0 to 3, and
$R^1$ may be a $C_1$-$C_4$-alkyl group, such as methyl or ethyl; a $C_1$-$C_4$-alkoxy group, such as methoxy or ethoxy; a trifluoromethyl group; a nitro group; a halogen atom such as fluorine, chlorine or bromine; an $NHCOCH_3$ group; an $SO_3H$ group; an $SO_2NR^{10}R^{11}$ group, where $R^{10}$ and $R^{11}$ are the same or different and represent hydrogen or $C_1$-$C_4$-alkyl; a $COOR^{10}$ group, where $R^{10}$ is as defined above; or a $COONR^{12}R^{13}$ group, where $R^{12}$ and $R^{13}$ independently represent hydrogen, $C_1$-$C_4$-alkyl or phenyl, wherein the phenyl, ring may be substituted by one, two or three identical or different substituents from the group consisting of $C_1$-$C_4$-alkyl, $C_1$-$C_4$-alkoxy, trifluoromethyl, nitro, halogen, $COOR^{10}$, where $R^{10}$ is as defined above, $COONR^{10}R^{11}$, where $R^{10}$ and $R^{11}$ are the same or different and are each as defined above, each $R^1$ being the same or different for n>1;

of the 2-hydroxynaphthalenes of the general formula (II),

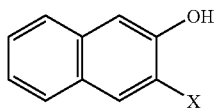

where
X is hydrogen, a COOH group or a group of the general formula (III),

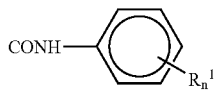

where n and $R^1$ are each as defined above;

of the bisacetoacetylated diaminophenyls and -biphenyls wherein the phenyl or biphenyl ring may be unsubstituted or substituted by 1, 2, 3 or 4 identical or different radicals $CH_3$, $C_2H_5$, $OCH_3$, $OC_2H_5$, $NO_2$, F, Cl, $CF_3$;

of the acetoacetarylides of binuclear heterocycles of the general formula (IV),

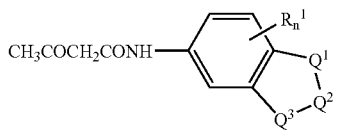

where n and $R^1$ are each as defined above,
$Q^1$, $Q^2$ and $Q^3$, which may be the same or different, represent N, $NR^2$, CO, N—CO, $NR^2$—CO, CO—N, CO—$NR^2$, CH, N—CH, $NR^2$—CH, CH—N, CH—$NR^2$, $CH_2$, N—$CH_2$, $NR^2$—$CH_2$, $CH_2$—N, $CH_2$—$NR^2$ or $SO_2$, wherein
$R^2$ is a hydrogen atom; a $C_1$-$C_4$-alkyl group, such as methyl or ethyl; or a phenyl group, which may be unsubstituted or singly or multiply substituted by halogen, $C_1$-$C_4$-alkyl, $C_1$-$C_4$-alkoxy, trifluoromethyl, nitro, cyano, with the proviso that the combination of $Q^1$, $Q^2$ and $Q^3$ with the two carbon atoms of the phenyl ring results in a saturated or unsaturated, 5- or 6-membered ring;

and also of the pyrazolones of the general formula (V)

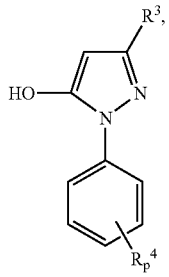

where
$R^3$ is a $CH_3$, $COOCH_3$ or $COOC_2H_5$ group,
$R^4$ is a $CH_3$, $SO_3H$ group or a chlorine atom, and
p is a number from 0 to 3,
wherein each $R^4$ may be the same or different for p>1.

Diaryl yellow pigments are particularly preferred azo pigments for the purposes of the present invention.

Diaryl yellow pigments generally have the formula (1)

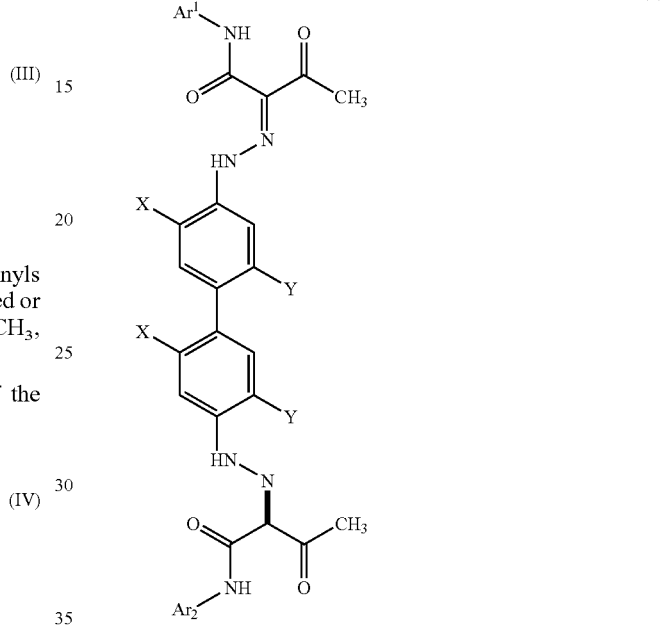

where $Ar^1$ and $Ar^2$ are the same or different and each represent a phenyl group, unsubstituted or substituted with one to three substituents from the group consisting of halogen, such as chlorine, methyl and methoxy, and X and Y are independently H or Cl.

Preferred diaryl yellow pigments for the purposes of the present invention are C.I. Pigment Yellow 12, 13, 14, 17, 55, 63, 81, 83, 87, 90, 106, 113, 114, 121, 124, 126, 127, 136, 152, 170, 171, 172, 174, 176 and 188.

Component b) is preferably a Diels-Alder adduct of rosin with a dienophilic component, such as maleic anhydride or fumaric acid, the rosin preferably being used in the form of commercial rosin varieties comprising resin acids from the group consisting of abietic acid, dehydroabietic acid, laevopimaric acid and palustric acid. The resin acids mentioned can also be used as such, of course. The Diels-Alder reaction is especially between laevopimaric acid, which may also be formed from other resin acids via equilibrium reaction, with a dienophile. Such compounds are known and described in Encyclopedia of Chem. Techn., Vol. 17, 1968, p. 488-490.

In accordance with the present invention, resins utilized have a high acid number of at least 320, preferably at least 330 and especially not less than 340 mgKOH/g of resin. The acid function in the resin is the carboxyl group of the original resin acid and the two carboxyl groups or the acid anhydride function of the dienophile. The acid anhydride group may be saponified.

Component c) may be an ammonium salt and preferably a tetraalkylammonium salt of a sulfonated diaryl yellow pigment. The diaryl yellow pigment may be any of those mentioned above, although P.Y. 12 is particularly preferred. Since component c) should ideally be only sparingly soluble in water, it preferably has only one sulfo group, disposed either in the $Ar^1$ radical or in $Ar^2$ (formula (1)). The alkyl radicals of the ammonium ion may be $C_1$-$C_{20}$-alkyl radicals. Preferably, the ammonium ion contains at least one $C_{10}$-$C_{20}$-alkyl radical and more preferably two thereof. Particularly preferred ammonium ions are dioctadecyldimethylammonium and dihexadecyidimethylammonium.

The particularly preferred component c) is the dioctadecyidimethylammonium sulfonate of Pigment Yellow 12.

The compounds described as component c) are known per se and disclosed in EP-A-0 076 024.

The azo pigment formulations of the present invention may include further auxiliary agents (d), such as dispersants, polyesteramides, anionic, cationic or nonionic surfactants, examples being alcohol oxyalkylates, antistats, extenders, standardizing agents, waxes, defoamers, anti-dust agents, preservatives, wetting agents, antioxidants, UV absorbers, further colorants for shading, light stabilizers or a combination thereof. Preference is given to using compounds based on fatty alcohol-ethylene oxide-propylene oxide adduct as described in EP-A-0 587 021.

The further, auxiliary agents are usually employed in amounts from 0% to 40% by weight, preferably 0. 01% to 20% by weight and especially 0.1% to 10% by weight, based on the total weight of the azo pigment formulation. Shading colorants are typically employed in amounts up to 10% by weight and usually 0.01% to 10% by weight, based on the total weight of the azo pigment formulation.

The present invention also provides a process for producing the azo pigment formulation of the present invention, the process comprising mixing the components a), b), c) and if appropriate the further, auxiliary agents d) with one another.

The components c) and d) can in principle be added at one or more stages during azo pigment production.

Where component a) is a diaryl yellow pigment, it is preferable to couple an acetoacetylanilide with a tetrazotized diazonium salt of the corresponding benzidine in the presence of component c) preferably in an amount of 0.1% to 20% by weight, based on the total weight of the azo pigment formulation, for the resulting pigment suspension to be combined with an aqueous alkaline solution of component b) in an amount of 5% to 45% by weight and heated to a temperature between 65 and 150° C.; to precipitate the diary yellow pigment formulation by acidifying and if appropriate to incorporate further component d) in an amount of 0% to 40% by weight.

The diazotization of the diazo component, preferably 3,3'-dichlorobenzidine, can be carried out in a conventional manner.

Coupling components used include for example acetoacetanilide, acetoacet-o-toluidide, acetoacet-m-toluidide, acetoacet-m-xylidide, acetoacet-anisidide, acetoacet-2,5-dimethoxy-4-chloroanilide, advantageously in an aqueous or aqueous-organic suspension.

The azo coupling can take place in the presence of one or more compounds of component c), in which case the latter can be added as an aqueous suspension or presscake either to the coupling suspension or the tetrazonium salt of benzidine or to both, or in which case the reactants mentioned are added at the same time.

The azo coupling is preferably carried out in an aqueous or aqueous-organic medium, preferably at a pH between 3 and 7, in particular between 4 and 6, and at a temperature between 15 and 30° C., in particular between 20 and 30° C.

The pigment suspension is subsequently admixed with an aqueous alkaline solution, for example in dilute aqueous sodium hydroxide solution or potassium hydroxide solution, of a resin b), the resin quantity based on pigment being 5% to 60% by weight and preferably 10% to 50% by weight. The mixture is subsequently heated for preferably at least 15 minutes, normally 30 minutes to 10 hours to a temperature of 65 to 150° C., preferably 80 to 120° C. and more preferably 85 to 100° C.

A pH of preferably 2 to 6 and more preferably 3 to 5 is subsequently set, for example with hydrochloric acid, sulfuric acid or acetic acid, and the azo pigment formulation of the present invention precipitates. The suspension is filtered, washed salt free, dried and if appropriate ground.

In a particularly preferred embodiment, 1% to 3% by weight of a fatty alcohol alkoxylate as described for example in EP-B1-0 587 021 is added as component d) to the suspension of the azo pigment.

The azo pigment formulations of the present invention are useful for pigmenting macromolecular organic materials of natural or synthetic origin, for example plastics, resins, coatings, paints, electrophotographic toners and developers, electret materials, color filters and also inks, including printing inks, and seed.

Macromolecular organic materials which can be pigmented with the azo pigment formulations of the present invention are for example cellulose compounds, for example cellulose ethers and esters, such as ethylcellulose, nitrocellulose, cellulose acetates or cellulose butyrates, natural binders, for example fatty acids, fatty oils, resins and their conversion products, or artificial resins, such as polycondensates, polyadducts, addition polymers and addition copolymers, examples being amino resins, especially urea- and melamine-formaldehyde resins, alkyd resins, acrylic resins, phenoplasts and phenolic resins, such as novolaks or resoles, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, cumarone-indene and hydrocarbon resins, epoxy resins, unsaturated synthetic resins (polyesters, acrylates) having various curing mechanisms, waxes, aldehydic and ketonic resins, gum, rubber and its derivatives and latices, casein, silicones and silicone resins; individually or in admixtures. It is immaterial whether the macromolecular organic compounds mentioned are in the form of plastically deformable compositions, melts or in the form of spinning solutions, dispersions, coatings, paints or printing inks. In accordance with the intended use, it is advantageous to use the azo pigment formulations of the present invention as a blend or in the form of formulations or dispersions. Based on the macromolecular organic material to be pigmented, the azo pigment formulations of the present invention are used in an amount from 0.05% to 30% by weight and preferably 0.1% to 15% by weight.

It is also possible in some cases to use a crude having a BET surface area of greater than 2 $m^2/g$ and preferably greater than 5 $m^2/g$ instead of the corresponding ground and/or finished azo pigment formulation of the present invention. This crude can be used for producing color concentrates in liquid or solid form in concentrations from 5% to 99% by weight, alone or if appropriate in admixture with other crudes or ready-produced pigments.

The azo pigment formulations of the present invention are also useful as a colorant in electrophotographic toners and developers, for example one- or two-component powder toners (also known as one- or two-component developers), magnetic toners, liquid toners, latex toners, addition polymerization toners and also specialty toners.

Typical toner binders are addition polymerization, polyaddition and polycondensation resins, such as styrene, styrene-acrylate, styrene-butadiene, acrylate, polyester, phenolepoxy resins, polysulfones, polyurethanes, individually or in combination, and also polyethylene and polypropylene, which may each contain further ingredients, such as charge control agents, waxes or flow assistants, or may subsequently be modified with these additives.

The azo pigment formulations of the present invention are further useful as a colorant in powders and powder coatings, especially in triboelectrically or electrokinetically sprayable powder coatings used for surface coating of articles composed of metal, wood, plastic, glass, ceramic, concrete, textile material, paper or rubber.

Useful powder coating resins typically include epoxy resins, carboxyl- and hydroxyl-containing polyester resins, polyurethane and acrylic resins together with customary hardeners. Combinations of resins can also be used. For instance, epoxy resins are frequently used in combination with carboxyl- and hydroxyl-containing polyester resins. Typical hardener components (depending on the resin system) include for example acid anhydrides, imidazoles and also dicyandiamide and derivatives thereof, blocked isocyanates, bisacylurethanes, phenolic and melamine resins, triglycidyl isocyanurates, oxazolines and dicarboxylic acids.

The azo pigment formulations of the present invention are also useful as a colorant in ink jet inks on an aqueous and nonaqueous basis, microemulsion inks and also in such inks as operate by the hot melt process.

Ink jet inks generally contain in total 0.5% to 15% by weight and preferably 1.5% to 8% by weight (reckoned dry) of one or more of the azo pigment formulations of the present invention.

Microemulsion inks are based on organic solvents, water and if appropriate an additional hydrotropic substance (interfacial mediator). Microemulsion inks contain in general 0.5% to 15% by weight and preferably 1.5% to 8% by weight of one or more of the azo pigment formulations of the present invention, 5% to 99% by weight of water and 0.5% to 94.5% by weight of organic solvent and/or hydrotropic compound.

Solvent-based ink jet inks contain preferably 0.5% to 15% by weight of one or more of the azo pigment formulations of the present invention, 85% to 99.5% by weight of organic solvent and/or hydrotropic compounds.

Hot melt inks are usually based on waxes, fatty acids, fatty alcohols or sulfonamides which are solid at room temperature and liquefy on heating, the preferred melting range being between about 60° C. and about 140° C. Hot melt ink jet inks consist for example essentially of 20% to 90% by weight of wax and 1% to 10% by weight of one or more of the azo pigment formulations of the present invention. They may further include 0% to 20% by weight of an additional polymer (as "dye dissolver"), 0% to 5% by weight of dispersing assistant, 0%. to 20% by weight of viscosity modifier, 0% to 20% by weight of plasticizer, 0% to 10% by weight of tackifying additive, 0% to 10% by weight of transparency stabilizer (prevents crystallization of waxes, for example) and also 0% to 2% by weight of an antioxidant.

The azo pigment formulations of the present invention are further useful as a colorant for color filters, not only for additive but also for subtractive generation of color, and also as a colorant for electronic inks (or "e-inks") or electronic paper ("e-paper").

The pigment formulations of the present invention are readily dispersible in customary gravure printing ink varnishes, for example for gravure and flexographic printing, to give printing inks possessing high gloss and particularly good rheological properties, namely lower thixotropy.

The present invention accordingly further provides in particular for the use of the disclosed azo pigment formulations for producing printing inks, in particular gravure printing inks and flexographic printing inks.

In the examples which follow, percentages are by weight, unless otherwise stated.

EXAMPLE 1

A coupling component suspension having a pH of 5.6, prepared by dissolving 37.6 parts of acetoacet-m-xylidide with 29.4 parts of 33% aqueous sodium hydroxide solution in 500 parts of water and subsequent precipitation with 20 parts of 80% acetic acid, is admixed with 4 parts of a fatty alcohol alkoxylate as described in Example 1 of EP-A-0 587 021 and 3.2 parts of dioctadecyidimethyl-ammonium sulfonate of P.Y.12 (component c). The suspension is subsequently coupled with an approximately 10% strength aqueous 3,3'-dichlorobenzidine tetrazo solution (prepared by bisdiazotization of 23 parts of 3,3'-dichlorobenzidine in dilute HCl and sodium nitrite) at a temperature of 20 to 25° C. and a pH range from 5.6 to 4 over two hours. The pigment suspension is adjusted to about pH 9 with aqueous sodium hydroxide solution and admixed with a resin solution consisting of 200 parts of water, 22.2 parts of 33% NaOH and 16.9 parts of a maleic acid rosin adduct of acid number 360. The temperature of the suspension is raised to 95° C. and maintained for 1.5 hours. At 65° C. (cooling with ice) the suspension is adjusted to pH 5 with hydrochloric acid, filtered, washed salt free, dried at 80° C. and pin milled to give 85 g of a diaryl yellow pigment formulation comprising P.Y. 13.

COMPARATIVE EXAMPLE 1a

Example 1 is repeated, except that a fumaric acid rosin adduct of acid number 300 is used as resin to give 85 g of a diaryl yellow pigment formulation comprising P.Y. 13.

COMPARATIVE EXAMPLE 1b

Example 1 is repeated, except that a maleic acid rosin adduct of acid number 150 is used as resin to give 84 g of a diaryl yellow pigment formulation comprising P.Y. 13.

EXAMPLE 2

A coupling component suspension having a pH of 5.0 and prepared by indirect precipitation of 69.5 parts of N-(4-chloro-2,5-dimethoxyphenyl)-3-hydroxy-2-naphthalenecarboxamide dissolved in 81 parts of 33%. aqueous sodium hydroxide solution in 400 parts of water and subsequent precipitation in 400 parts of water, 81 parts of 31% hydrochloric acid and 10.2 parts of 80% acetic acid is admixed with 3 parts of a fatty alcohol alkoxylate as described in Example 1 of EP-A-0 587 021.

The suspension is subsequently coupled with an approximately 9% strength aqueous solution of the diazonium chloride of 3-amino4-methoxy-N-phenyl-benzamide (prepared by diazotizing 44 parts of 3-amino4-methoxy-N-phenyl-benzamide in dilute HCl and sodium nitrite) at a temperature of 40° C. and a pH range of 5 over an hour.

The pigment suspension is adjusted to about pH 9 with aqueous sodium hydroxide solution and admixed with a resin solution consisting of 400 parts of water, 32 parts of 33% NaOH and 17 parts of a maleic acid rosin adduct of acid number 360. The temperature of the suspension is raised to 95° C. and maintained for 2 hours. The suspension is subsequently admixed with 5.5 parts of a commercially available fatty alcohol alkoxylate as described in Example 1 of EP-A-0 587 021. At 65° C. (cooling with ice) the suspension is adjusted to pH 5 with hydrochloric acid, filtered, washed salt free, and the presscake has 1.8 parts of dioctadecyldimethylammonium sulfonate of P.Y.12 (component c) kneaded into it, is dried at 80° C. and pin milled to obtain 134 g of a pigment formulation comprising P.R. 146.

COMPARATIVE EXAMPLE 2a

Example 2 is repeated, except that a fumaric acid rosin adduct of acid number 300 is used as resin to give 136 g of a pigment formulation comprising P.Y. 146.

COMPARATIVE EXAMPLE 2b

Example 2 is repeated, except that a maleic acid rosin adduct of acid number 150 is used as resin to give 136 g of a pigment formulation comprising P.Y. 146.

EXAMPLE 3

To 600 parts of water are added 0.3 part of a nonionic surfactant (nonylphenol oxethylate), 19 parts of 33% aqueous sodium hydroxide solution, 19 parts of 80% acetic acid with stirring, followed at 10° C. by 64.7 parts of acetoacetanilide. The suspension is subsequently coupled with an approximately 10% strength aqueous 3,3'-dichlorobenzidine tetrazo solution (prepared by bisdiazotization of 23 parts of 3,3'-dichlorobenzidine in dilute HCl and sodium nitrite) at a temperature of 20 to 25° C. and a pH range of 5.6 to 4 over two hours. The pigment suspension is adjusted to about pH 9 with aqueous sodium hydroxide solution and admixed with 0.4 part of a fatty alcohol alkoxylate as described in Example 1 of EP-A-0 587 021, with a resin solution consisting of 82 parts of water, 6.1 parts of 33% aqueous NaOH and 8.17 parts of a maleic acid rosin adduct of acid number 360. The temperature of the suspension is raised to 95° C. and maintained for 3 hours. The suspension is subsequently admixed with 1.2 parts of dioctadecyldimethylammonium sulfonate of P.Y.12 (component c). At 65° C. (cooling with ice) the suspension is adjusted to pH 5 with hydrochloric acid, filtered, washed salt free, dried at 80° C. and pin milled to give 65 g of a diaryl yellow pigment formulation comprising P.Y. 12.

COMPARATIVE EXAMPLE 3a

Example 3 is repeated except that a fumaric acid rosin adduct of acid number 300 is used as resin to give 65 g of a diaryl yellow pigment formulation comprising P.Y. 12.

COMPARATIVE EXAMPLE 3b

Example 3 is repeated except that a maleic acid rosin adduct of acid number 150 is used as resin to give 66 g of a diaryl yellow pigment formulation comprising P.Y. 12.

EXAMPLE 4

A coupling component suspension having a pH of 5.6 and prepared by indirect precipitation of 49.9 parts of acetoacet (2,5-dimethoxy-4-chloroanilide) dissolved in 25 parts of 33% aqueous sodium hydroxide solution in 200 parts of water and subsequent precipitation in 400 parts of water, 23.4 parts of 80% acetic acid, is admixed with 5 parts of a nonionic surfactant (nonylphenol oxethylate). The suspension is subsequently coupled with an approximately 10% strength aqueous 3,3'-dichlorobenzidine tetrazo solution (prepared by bisdiazotization of 23 parts of DCB in dilute HCl and sodium nitrite) at a temperature of 20 to 25° C. and a pH range between 5.6 and 4.5 over an hour.

The pigment suspension is adjusted to about pH 9 with aqueous sodium hydroxide solution and admixed with a resin solution consisting of 150 parts of water, 8 parts of NaOH and 9.7 parts of a maleic acid rosin adduct of acid number 360. The temperature of the suspension is raised to 95° C. and maintained for 0.5 hours. The suspension is subsequently mixed with 5 parts of dioctadecyl-dimethylammonium sulfonate of P.Y.12 (component c). At 65° C. (cooling with ice) the suspension is adjusted to pH 4.5 with hydrochloric acid, filtered, washed salt free, dried at 70C and pin milled to give 91 g of a diaryl yellow pigment formulation comprising P.Y. 83.

EXAMPLE 4a

Example 4 is repeated except that a maleic acid rosin adduct of acid number 340 is used as resin to give 92 g of a diaryl yellow pigment formulation comprising P.Y. 83.

COMPARATIVE EXAMPLE 4b

Example 4 is repeated except that a maleic acid rosin adduct of acid number 300 is used as resin to give 91.5 g of a diary yellow pigment formulation comprising P.Y. 83.

COMPARATIVE EXAMPLE 4c

Example 4 is repeated except that a maleic acid rosin adduct of acid number 150 is used as resin to give 92 g of a diaryl yellow pigment formulation comprising P.Y. 83.

EXAMPLE 5

A coupling component suspension having a pH of 5.5 and prepared by dissolving 39.0 parts of acetoacet-o-anisidide with 48.3 parts of 33% aqueous sodium hydroxide solution in 200 parts of water and subsequent precipitation with 33 parts of 80% acetic acid is coupled with an approximately 10% strength aqueous solution of the diazonium chloride of 5-nitro-2-aminoanisole (prepared by diazotization of 30.6 parts of 5-nitro-2-aminoanisole in dilute HCl and sodium nitrite) at a temperature of 18 to 20° C. and a pH range of 5.5 to 4 over two hours. The pigment suspension is adjusted to about pH 9 with aqueous sodium hydroxide solution and admixed with a resin solution consisting of 235 parts of water, 17.6 parts of 33% NaOH, 11 parts of a maleic acid rosin adduct of acid number 360 and with 2 parts of a commercially available fatty alcohol alkoxylate of about 40° C. cloud point. The temperature of the suspension is raised to 95° C. and maintained for 0.5 hours. At 65° C. (cooling with ice) the suspension is adjusted to pH 5 with hydrochloric acid, admixed with 5 parts of dioctadecyldimethylammonium sulfonate of P.Y.12 (component c), filtered, washed salt free, dried at 80° C. and pin milled to give 85 g of a diaryl yellow pigment formulation comprising P.Y. 74.

COMPARATIVE EXAMPLE 5a

Example 5 is repeated, except that a fumaric acid rosin adduct of acid number 300 is used as resin to give 85 g of a diaryl yellow pigment formulation comprising P.Y. 74.

USE EXAMPLES

Production of Dispersing Concentrates to Determine Thixotropy

This test method is used for testing pigments and pigment formulations used for making solvent-containing printing ink concentrates having particularly high pigment concentrations:

Apparatus:

DIN 53 238 shaking machine. Model "Disperser DAS 200 K" vent stage 1, shaking frequency stage 2 (660 rpm); zirconium oxide balls: SAZ beads zirconium oxide 69%, ER 120S, narrow sieving, Ø=1.0-1.25 mm;

sieve to separate the ink from the zirconium oxide balls, for example metal or textile sieve or E-D-Schnellsieb rapid sieve coarse, 1000 μm;

glass bottles (210 ml) 0 55 mm×105 mm with metal screw cap.

NC alcohol gravure printing varnish of the following composition:

| | |
|---|---|
| 25.0% | of nitrocellulose (100%) |
| 75.0% | of ethanol (anhydrous) |
| 100.0% | |

Solvent mixture of the following composition:

| | |
|---|---|
| 98.0% | of ethanol (99.9%) |
| 2.0% | of ethyl acetate (99.9%) |
| 100.0% | |

Procedure:

Shaking Machine Grinding

Into the glass bottles are filled 150 g of zirconium oxide balls followed, according to the pigment formulation (see table 1), by the appropriate weighed-out amount of varnish, solvent mixture and pigment formulation. The glass bottles are shaken for 45 min on the shaking machine (Disperser DAS 200 K" vent stage 1, shaking frequency stage 2 (660 rpm).

TABLE 1

| Pigment formulation | Pigment conc. [%] | Pigment amount [g] | Varnish [g] | Solvent mixture [g] |
|---|---|---|---|---|
| P.Y.13 | 24 | 24.00 | 38.00 | 38.00 |
| P.Y.12 | 24 | 20.00 | 40.00 | 40.00 |
| P.Y.74 | 25 | 25.00 | 40.00 | 35.00 |

TABLE 1-continued

| Pigment formulation | Pigment conc. [%] | Pigment amount [g] | Varnish [g] | Solvent mixture [g] |
|---|---|---|---|---|
| P.Y.83 | 13.5 | 13.50 | 44.00 | 42.50 |
| P.R.146 | 23 | 23.00 | 40.00 | 37.00 |

Determination of Flow Curve

The dispersing concentrates are temperature controlled at 23° C. An RS 1 rotary viscometer from Haake is used to determine the flow curve:

1st Rotation (shear rate γ)—ramp—ascending, for example from 0-250 1/s in 3 min.

2nd Rotation (shear rate γ)—ramp—descending, for example from 250-0 1/s in 3 min.

Calculation of Thixotropy:

The thixotropy value ΔA is determined as the difference in area between the ascending curve of the τ axis and the descending curve of the τ axis.

This computation is integrated into the measuring process.

In accordance with the present invention, very small ΔA values are desired. The results are summarized in table 2.

TABLE 2

| Pigment formulation according to Example | ΔA in Pa/s |
|---|---|
| 1 | 381 |
| 1a (comparative) | 1111 |
| 1b (comparative) | 2284 |
| 2 | 1254 |
| 2a (comparative) | 1478 |
| 2b (comparative) | 2092 |
| 3 | 1198 |
| 3a (comparative) | 1393 |
| 3b (comparative) | 1351 |
| 4 | 4503 |
| 4a | 4628 |
| 4b (comparative) | 4842 |
| 4c (comparative) | 5029 |
| 5 | 121 |
| 5a (comparative) | 137 |

We claim:

1. An azo pigment formulation comprising
    a) at least one azo pigment,
    b) a resin based on rosin or modified rosin having an acid number of not less than 320 mgKOH/g, and
    c) an ammonium salt of a sulfonated diaryl yellow pigment.

2. The azo pigment formulation according to claim 1 wherein the azo pigment is a diaryl yellow pigment.

3. The azo pigment formulation according to claim 2 wherein the diaryl yellow pigment is a pigment selected from the group consisting of C.I. Pigment Yellow 12, 13, 14, 17, 55, 63, 81, 83, 87, 90, 106, 113, 114, 121, 124, 126, 127, 136, 152, 170, 171, 172, 174, 176 188, and a combination thereof.

4. The azo pigment formulation according to claim 1, wherein the resin has an acid number of not less than 330 mg KOH/g.

5. The azo pigment formulation according to claim 1, wherein the resin is a Diels-Alder adduct of rosin with maleic anhydride or fumaric acid.

6. The azo pigment formulation according to claim 1, wherein component c) is dioctadecyldimethylammonium sulfonate of Pigment Yellow 12.

7. The azo pigment formulation according to claim 1, consisting essentially of
50% to 90% by weight of component a),
5% to 45% by weight of component b),
0.1% to 20% by weight of component c), and
0% to 40% by weight of further, auxiliary agents d),
based on the total weight of the azo pigment formulation.

8. A process for producing an azo pigment formulation according to claim 1, comprising the step of mixing components a), b), and c).

9. A macromolecular organic material of natural or synthetic origin pigmented by an azo pigment formulation according to claim 1, wherein the macromolecular organic material of natural or synthetic origin is selected from the group consisting of, plastics, resins, coatings, paints, electrophotographic toners, electrophotoaraphic developers, electret materials, color filters, printing inks, ink jet inks, and seed.

10. A printing ink, gravure printing ink or flexographic printing ink pigmented by an azo pigment formulation according to claim 1.

* * * * *